(12) United States Patent
Tremblay et al.

(10) Patent No.: US 11,715,251 B2
(45) Date of Patent: *Aug. 1, 2023

(54) NEURAL NETWORK MODEL TRAINED USING GENERATED SYNTHETIC IMAGES

(71) Applicant: NVIDIA Corporation, Santa Clara, CA (US)

(72) Inventors: Jonathan Tremblay, Redmond, WA (US); Aayush Prakash, Toronto (CA); Mark A. Brophy, Toronto (CA); Varun Jampani, Nashua, NH (US); Cem Anil, Toronto (CA); Stanley Thomas Birchfield, Sammamish, WA (US); Thang Hong To, Redmond, WA (US); David Jesus Acuna Marrero, Toronto (CA)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,620

(22) Filed: Oct. 21, 2021

(65) Prior Publication Data

US 2022/0044075 A1  Feb. 10, 2022

Related U.S. Application Data

(63) Continuation of application No. 17/119,971, filed on Dec. 11, 2020, now Pat. No. 11,182,649, which is a (Continued)

(51) Int. Cl.
G06T 15/00 (2011.01)
G06T 15/04 (2011.01)
(Continued)

(52) U.S. Cl.
CPC ............ *G06T 15/00* (2013.01); *G06F 18/211* (2023.01); *G06F 18/2148* (2023.01);
(Continued)

(58) Field of Classification Search
CPC ... G06K 9/6228; G06T 15/20; G06T 2210/12; G06T 15/00; G06T 15/205;
(Continued)

(56) References Cited

U.S. PATENT DOCUMENTS 7,391,907 B1   6/2008  Venetianer et al.
8,811,663 B2   8/2014  Brown et al.
(Continued)

FOREIGN PATENT DOCUMENTS

CN   106169082 A   11/2016
CN   106462626 A   2/2017
(Continued)

OTHER PUBLICATIONS

Tobin, J., Fong, R., Ray, A., Schneider, J., Zaremba, W., & Abbeel, P. (Sep. 2017). Domain randomization for transferring deep neural networks from simulation to the real world. In 2017 IEEE/RSJ international conference on intelligent robots and systems (IROS) (pp. 23-30). IEEE.*
(Continued)

Primary Examiner — Sarah Lhymn
(74) Attorney, Agent, or Firm — Leydig, Voit & Mayer, Ltd.

(57) ABSTRACT

Training deep neural networks requires a large amount of labeled training data. Conventionally, labeled training data is generated by gathering real images that are manually labelled which is very time-consuming. Instead of manually labelling a training dataset, domain randomization technique is used generate training data that is automatically labeled. The generated training data may be used to train neural
(Continued)

networks for object detection and segmentation (labelling) tasks. In an embodiment, the generated training data includes synthetic input images generated by rendering three-dimensional (3D) objects of interest in a 3D scene. In an embodiment, the generated training data includes synthetic input images generated by rendering 3D objects of interest on a 2D background image. The 3D objects of interest are objects that a neural network is trained to detect and/or label.

22 Claims, 14 Drawing Sheets

Related U.S. Application Data continuation of application No. 16/256,820, filed on Jan. 24, 2019, now Pat. No. 10,867,214.

(60) Provisional application No. 62/630,722, filed on Feb. 14, 2018.

(51) Int. Cl.
| | |
|---|---|
| *G06T 15/50* | (2011.01) |
| *G06T 15/20* | (2011.01) |
| *G06F 18/214* | (2023.01) |
| *G06F 18/211* | (2023.01) |
| *G06V 10/774* | (2022.01) |
| *G06V 10/82* | (2022.01) |
| *G06N 3/04* | (2023.01) |
| *G06N 3/084* | (2023.01) |

(52) U.S. Cl.
CPC .............. *G06T 15/04* (2013.01); *G06T 15/20* (2013.01); *G06T 15/50* (2013.01); *G06V 10/7747* (2022.01); *G06V 10/82* (2022.01); *G06N 3/04* (2013.01); *G06N 3/084* (2013.01); *G06T 2210/12* (2013.01); *G06V 2201/07* (2022.01)

(58) Field of Classification Search
CPC ...... G06T 2207/20081; G06V 2201/07; G06V 10/7747; G06V 10/82; G06N 3/0454; G06N 3/08
See application file for complete search history.

(56) References Cited

U.S. PATENT DOCUMENTS

| | | | |
|---|---|---|---|
| 9,466,000 B2 | 10/2016 | Bhanu et al. | |
| 9,646,227 B2 | 5/2017 | Suri et al. | |
| 9,665,800 B1 | 5/2017 | Kuffner, Jr. | |
| 9,842,253 B2 | 12/2017 | Dubuque | |
| 9,928,605 B2 | 3/2018 | Bleiweiss et al. | |
| 9,940,522 B2 | 4/2018 | Wu et al. | |
| 10,235,601 B1 | 3/2019 | Wrenninge et al. | |
| 2015/0235407 A1 | 8/2015 | Schutz et al. | |
| 2016/0231411 A1 | 8/2016 | Kumar et al. | |
| 2017/0061625 A1 | 3/2017 | Estrada et al. | |
| 2017/0236013 A1 | 8/2017 | Clayton et al. | |
| 2018/0114334 A1 | 4/2018 | Desai et al. | |
| 2018/0345496 A1* | 12/2018 | Li | G06F 30/20 |
| 2019/0080205 A1 | 3/2019 | Kaufhold et al. | |
| 2019/0171223 A1* | 6/2019 | Liang | G06K 9/6267 |
| 2019/0205667 A1 | 7/2019 | Avidan et al. | |
| 2020/0012923 A1 | 1/2020 | Ghosh et al. | |
| 2020/0034626 A1 | 1/2020 | Ferroni | |
| 2020/0057904 A1 | 2/2020 | Amon et al. | |
| 2020/0089930 A1 | 3/2020 | Estrada et al. | |
| 2022/0318459 A1* | 10/2022 | Narang | G06F 30/27 |

FOREIGN PATENT DOCUMENTS

| | | |
|---|---|---|
| CN | 107689073 A | 2/2018 |
| CN | 107690672 A | 2/2018 |
| EP | 2843621 A1 | 4/2015 |
| EP | 3218076 A1 | 9/2017 |
| WO | 2017060894 A1 | 4/2017 |
| WO | 2017065030 A1 | 4/2017 |
| WO | 2018005701 A1 | 1/2018 |
| WO | 2018009405 A1 | 1/2018 |
| WO | 2018065158 A1 | 4/2018 |

OTHER PUBLICATIONS

U.S. Appl. No. 17/119,971, filed Dec. 11, 2020.
Varol, G , et al., "Learning from synthetic humans," In Proceedings of the IEEE Conference on Computer Vision and Pattern Recognition, (pp. 109-117).
Green, Robin, "Spherical harmonic lighting: the gritty details," Archives of the Game Developers Conference, vol. 56, 2003 (pp. 1-47).
Kubat, et al., "Machine-Learning Issues in Model-Based Object Recognition," Proceedings of 19th OAGM and 1st SDVR workshop 1995, 6 pages. Retrieved from http://staff.fh-hagenberg.at/burger/publications/pdf/learning-oagm95.
Borrego et al., "A Generic Visual Perception Domain Randomisation Framework for Gazebo," 2018 IEEE Int'l Conference on Autonomous Robot Systems and Competitions (ICARSC), 6 pp. Retrieved from http://vislab.isr.ist.utl.pt/wp-content/uploads/2018/04/jborrego-icarsc2018.pdf.
Mitash et al., "Physics-aware Self-supervised Training of CNNs for Object Detection," 2016 conference paper, 8 pp. Retrieved from https://pdfs.semanticscholar.org/b7cc/4f122b547272848372a2eb43bd1ef203c038.pdf.
Szegedy et al., "Deep Neural Networks for Object Detection," NIPS Proceedings 2013, 9 pp. Retrieved from https://papers.nips.cc/paper/5207-deep-neural-networks-for-object-detection.pdf.
CN Office Action dated Nov. 18, 2022 in CN Application No. 2019101160797.

* cited by examiner

NEURAL NETWORK MODEL TRAINED USING GENERATED SYNTHETIC IMAGES

CLAIM OF PRIORITY

This application is a continuation of U.S. application Ser. No. 17/119,971 titled "GENERATION OF SYNTHETIC IMAGES FOR TRAINING A NEURAL NETWORK MODEL," filed Dec. 11, 2020 that claims the benefit of U.S. Pat. No. 10,867,214 titled "GENERATION OF SYNTHETIC IMAGES FOR TRAINING A NEURAL NETWORK MODEL," issued Dec. 15, 2020 that claims the benefit of U.S. Provisional Application No. 62/630,722 titled "A SYSTEM AND METHOD FOR TRAINING A COMPUTER VISION SYSTEM USING NON-REALISTIC SYNTHETIC DATA," filed Feb. 14, 2018, the entire contents of these applications are incorporated herein by reference.

TECHNICAL FIELD

The present disclosure relates to synthetic images, and more particularly to generating synthetic images for training a neural network model.

BACKGROUND

Training deep neural networks requires a large amount of labeled training data. Conventionally, labeled training data is generated by gathering real images that are manually labelled which is very time-consuming. There is a need for addressing these issues and/or other issues associated with the prior art.

SUMMARY

A domain randomization technique for generate training data that is automatically labeled is described. The generated training data may be used to train neural networks for object detection and segmentation tasks. In an embodiment, the generated training data includes synthetic input images generated by rendering three-dimensional (3D) objects of interest in a 3D scene. In an embodiment, the generated training data includes synthetic input images generated by rendering 3D objects of interest on a 2D background image. The 3D objects of interest are objects that a neural network is trained to detect and/or segment.

A method, computer readable medium, and system are disclosed for generating synthetic images for training a neural network model. A three-dimensional (3D) object of interest is rendered to produce a rendered image of the object of interest, where an input image comprises the rendered image of the object of interest and a background image. Task-specific training data corresponding to the object of interest is computed and the task-specific training data corresponding to the object of interest and the input image are included as a test pair in a training dataset for training a neural network.

DETAILED DESCRIPTION

Training deep neural networks requires a large amount of labeled training data. A domain randomization technique to generate training data that is automatically labeled is described. The generated training data may be used to train neural networks for object detection and segmentation tasks. Domain randomization intentionally abandons photorealism by randomly perturbing the environment in non-photorealistic ways (e.g., by adding random textures) to force a neural network model to learn to focus on the essential features of images. More specifically, the neural network model is trained to detect objects of interest and ignore other objects in the images. In an embodiment, the generated training data is used to train a neural network model for the task of object detection. In an embodiment, the generated training data is used to train a neural network model for the task of instance segmentation. In an embodiment, the generated training data is used to train a neural network model for the task of semantic segmentation.

Figure 1A:
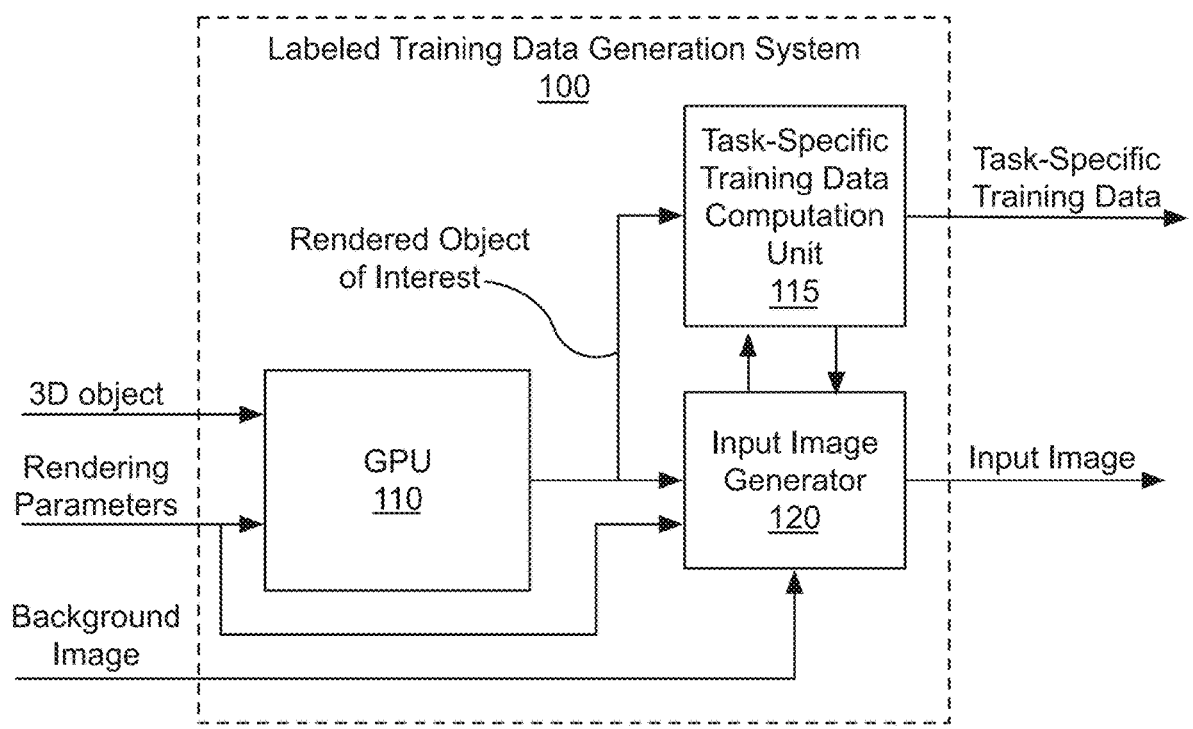
FIG. 1A illustrates a block diagram of a labeled training data generation system, in accordance with an embodiment.
Figure 3:
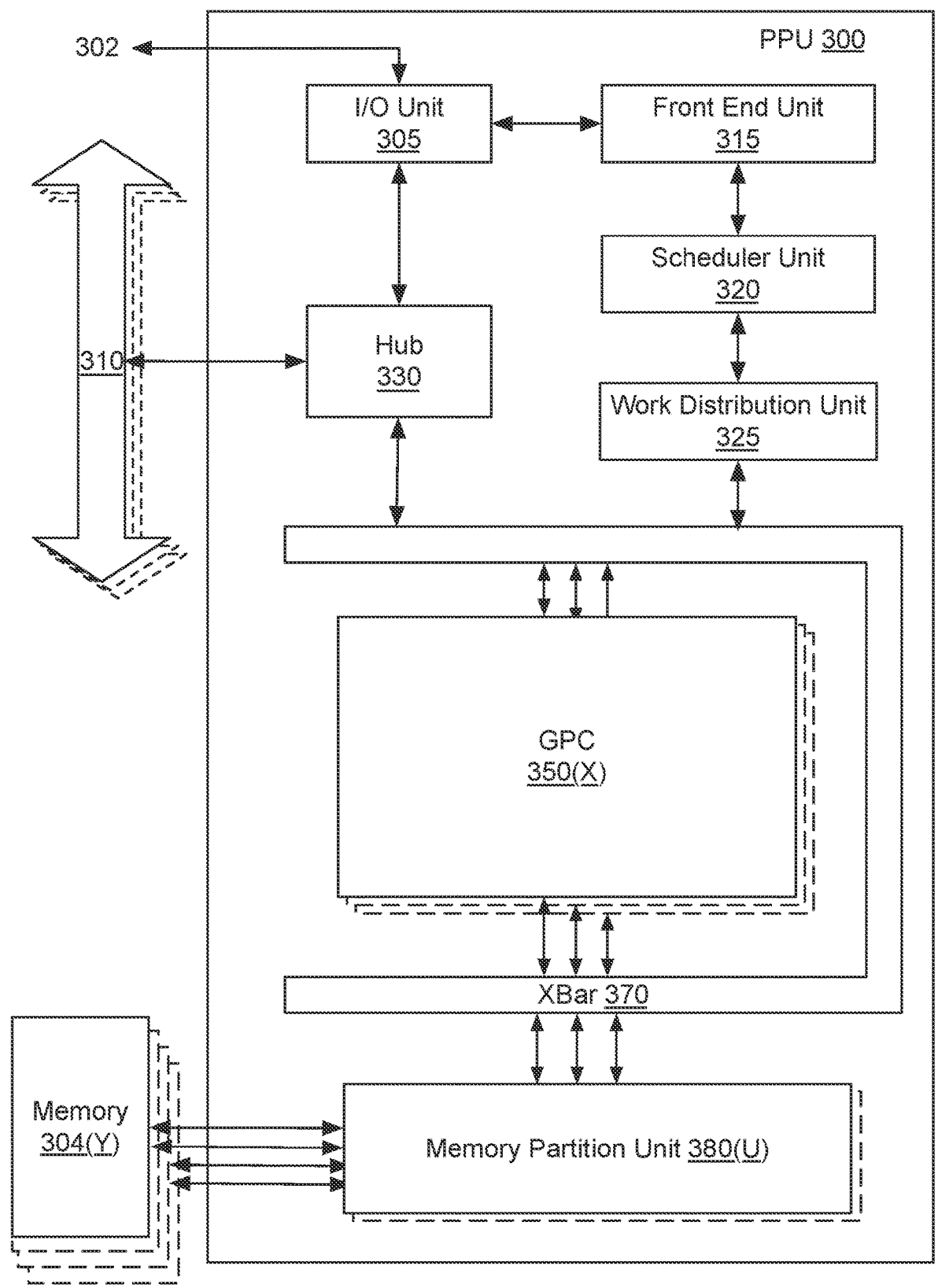
FIG. 3 illustrates a parallel processing unit, in accordance with an embodiment.

FIG. 1A illustrates a block diagram of a labeled training data generation system 100, in accordance with an embodiment. The labeled training data generation system 100 includes a graphics processing unit (GPU) 110, a task-specific training data computation unit 115, and an input image generator 120. Although the labeled training data generation system 100 is described in the context of processing units, one or more of the GPU 110, the task-specific training data computation unit 115, and the input image generator 120 may be performed by a program, custom circuitry, or by a combination of custom circuitry and a program. For example, the task-specific training data computation unit 115 may be implemented by the GPU 110 or an additional GPU 110, CPU (central processing unit), or any processor capable of computing task-specific training data. In an embodiment, parallel processing unit (PPU) 300 of FIG. 3 is configured to implement the labeled training data generation system 100. Furthermore, persons of ordinary skill in the art will understand that any system that performs the operations of the labeled training data generation system 100 is within the scope and spirit of embodiments of the present disclosure.

The GPU 110 receives a 3D synthetic object (object of interest) and rendering parameters. The GPU 110 processes the 3D object according to the rendering parameters to generate a rendered image of the 3D object, specifically, a rendered image of the object of interest. Importantly, the rendered image is an image of a synthetic object of interest and is not a photorealistic image or an object extracted from a photorealistic image. The rendering parameters may specify a position and/or orientation of the object of interest in a 3D scene, a position and/or orientation of a virtual camera, one or more texture maps, one or more lights including color, type, intensity, position and/or orientation, and the like. In an embodiment, the object of interest may be rendered according to different rendering parameters to produce additional rendered images of the object of interest. In an embodiment, one or more different objects of interest may be rendered according to the same or different rendering parameters to produce additional rendered images of objects of interest.

The task-specific training data computation unit 115 receives the rendered image(s) of the object(s) of interest and computes task-specific training data. In an embodiment, the task is object detection and the training data computation unit 115 computes bounding boxes for the rendered image(s) of the object(s) of interest. The training data computation unit 115 may receive location coordinates from the input image generator 120 defining a location in the input image for each rendered image of an object of interest. In an embodiment, the task-specific training data comprise a location and dimensions of a bounding box enclosing each rendered image of an object of interest.

In an embodiment, the task is segmentation and the training data computation unit 115 determines an object identifier for each rendered image of an object of interest and computes the task-specific training data as a segmentation map corresponding to the input image. For semantic segmentation, a different object identifier may be determined for each object of interest and the segmentation map comprises the input image, where each pixel that is covered by a rendered image is colored according to the object identifier determined for the object of interest. For instance segmentation, a different object identifier may be determined for each instance of a rendered image in the input image and the segmentation map comprises the input image, where each pixel that is covered by a rendered image is colored according to the object identifier determined for the instance.

The input image generator 120 receives the rendered image of the object of interest and a background image. The input image generator 120 constructs an input image that combines the background image and the rendered image(s) of the object(s) of interest. The input image is paired with the task-specific training data to produce a test pair for generated labeled training data for training a neural network model. The rendered objects of interest are 3D synthetic objects that a neural network model may be trained to detect and/or segment.

In an embodiment, the input image generator 120 combines or composites the rendered image(s) of the object(s) of interest with a two-dimensional (2D) background image to produce the input image. In an embodiment, the background image is a synthetic image. In an embodiment, the background image is a photorealistic image. In an embodiment, a 3D scene is rendered by the GPU 110 or another processor to produce the background image. In an embodiment, the input image generator 120 is omitted and the GPU 110 renders the object(s) of interest within a 3D scene corresponding to the background image, generating the input image comprising both the background image and the rendered image(s) of the object(s) of interest.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Training and testing a deep neural network is a time-consuming and expensive task which typically involves collecting and manually annotating a large amount of data for supervised learning. This requirement is problematic when the task demands either expert knowledge, labels that are difficult to specify manually, or images that are difficult to capture in large quantities with sufficient variety. For example, 3D poses or pixelwise segmentation can take a substantial amount of time for a human to manually label a single image.

Figure 1B:
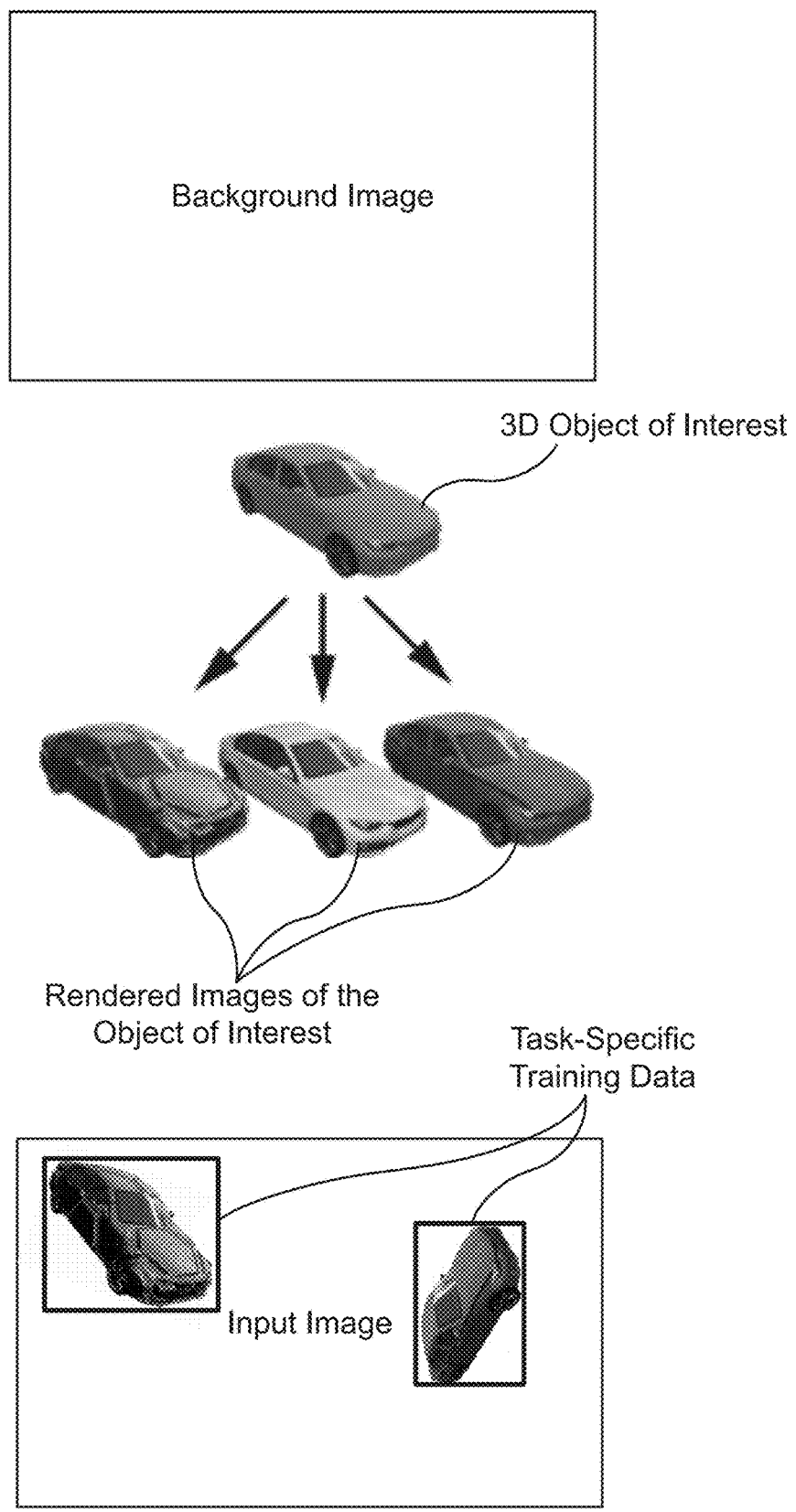
FIG. 1B illustrates a background image, rendered images of an object of interest, and an input image with task-specific training data, in accordance with an embodiment.

FIG. 1B illustrates a background image, rendered images of a 3D object of interest, and an input image with task-specific training data, in accordance with an embodiment. In an embodiment, the background image is a 2D image. The background image may be produced by rendering a 3D scene. In an embodiment, the background image is selected from a set of background images. In an embodiment, the background image is randomly selected by the labeled training data generation system 100.

As shown in FIG. 1B, a 3D synthetic object of interest (automobile) is rendered to produce three different rendered images of the object of interest. Note that at least a portion of the rendering parameters vary for each one of the rendered images. For example, a texture map is applied to a first rendering of the 3D synthetic object, a first color is used to render the body of the 3D synthetic object for a second rendering, and a second color is used to render the body of the 3D synthetic object for a third rendering. In addition to or in lieu of changing the color or applying a texture to the 3D synthetic object, the orientation of the 3D synthetic object may vary. In an embodiment, the 3D synthetic object is selected from a set of 3D synthetic objects. In an embodiment, one or more of the 3D synthetic objects are selected by the labeled training data generation system 100.

The rendering parameters specify aspects of a 3D scene including the 3D synthetic object(s) of interest to be rendered and, therefore, may affect the appearance of the rendered 3D synthetic object(s) of interest. In an embodiment, the position of the virtual camera with respect to the 3D scene (e.g., azimuth, elevation, etc.) is defined by the rendering parameters. In an embodiment, an orientation of the virtual camera with respect to the 3D scene (e.g., pan, tilt, and roll) is defined by the rendering parameters. In an embodiment, the position and/or the orientation of the virtual camera with respect to the 3D scene (e.g., pan, tilt, and roll) is randomly determined by the labeled training data generation system 100. In an embodiment, a number and position of one or more point lights is defined by the rendering parameters. In an embodiment, the number and position of one or more point lights is randomly determined by the labeled training data generation system 100. In an embodiment, a planar light for ambient light is defined by the rendering parameters. In an embodiment, visibility of a ground plane in the 3D scene is defined by the rendering parameters.

The input image generator 120 constructs the input image by combining the rendered object(s) of interest and the background image, positioning the rendered object(s) of interest at various positions within the input image. Each rendered object of interest may be scaled in size and/or rotated. In an embodiment, the number of rendered objects of interest and the position, scale, and/or rotation for each rendered object of interest is defined by the rendering parameters. In an embodiment, the number of rendered objects of interest and the position, scale, and/or rotation for each rendered object of interest is randomly determined by the input image generator 120. As shown in FIG. 1B, the task-specific training data computed by the task-specific training data computation unit 115 for each rendered object of interest is a bounding box. The task-specific training data is not included as part of the input image data, but is instead paired with the input image data. During supervised training of a neural network model, the task-specific training data is ground truth labels corresponding to the rendered object(s) of interest that are compared with an output generated by the neural network model when the input image is processed by the neural network model.

Figure 1C:
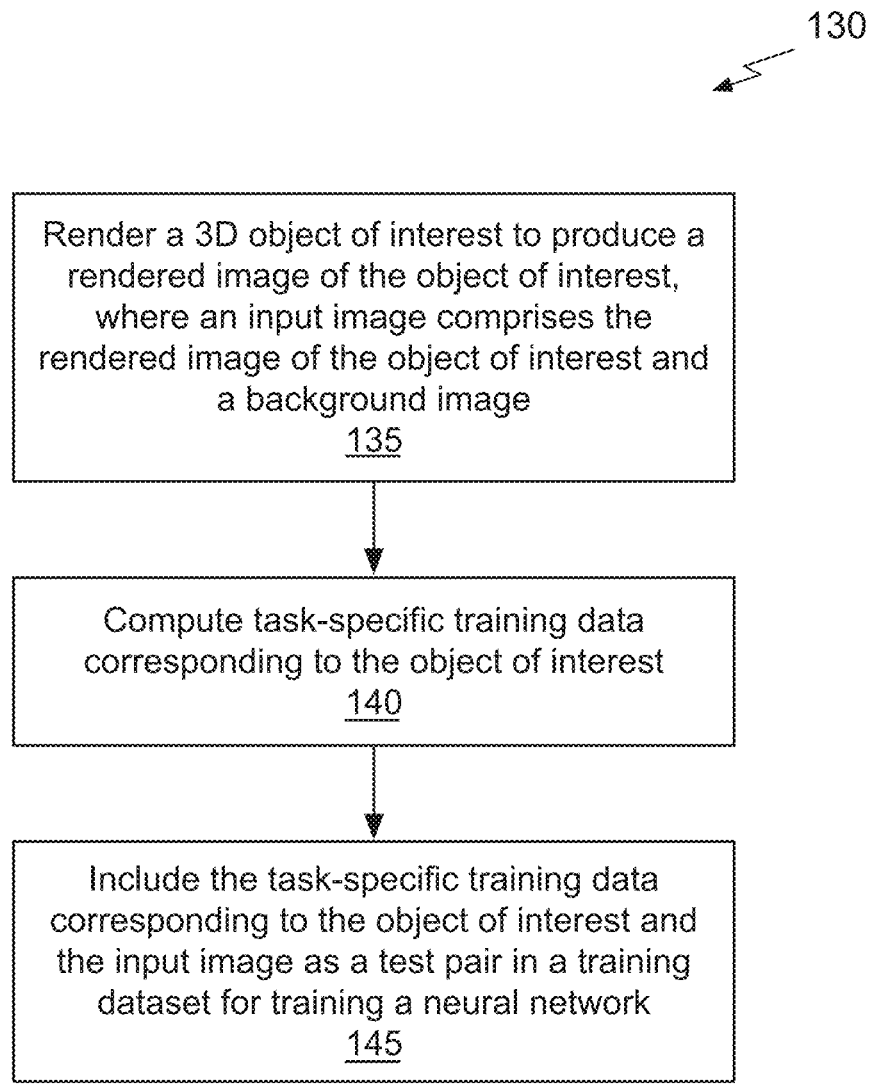
FIG. 1C illustrates a flowchart of a method for generating labeled training data, in accordance with an embodiment.

FIG. 1C illustrates a flowchart of a method 130 for generating labeled training data, in accordance with an embodiment. Although method 130 is described in the context of a processing unit, the method 130 may also be performed by a program, custom circuitry, or by a combination of custom circuitry and a program. For example, the method 130 may be executed by a GPU (graphics processing unit), CPU (central processing unit), or any processor capable of rendering 3D objects, constructing images, and computing labels. Furthermore, persons of ordinary skill in the art will understand that any system that performs method 130 is within the scope and spirit of embodiments of the present disclosure.

At step 135, the GPU 110 renders a 3D object of interest to produce a rendered image of the object of interest, where an input image comprises the rendered image of the object of interest and a background image. The 3D object of interest is rendered according to the rendering parameters. In an embodiment, the GPU 110 renders the 3D object of interest using different rendering parameters to produce additional rendered images of the object of interest. In an embodiment, the GPU 110 renders a different 3D object of interest using the same rendering parameters as are used to render the 3D object of interest or using different rendering parameters to produce additional rendered images of objects of interest.

At step 140, task-specific training data corresponding to the object of interest is computed by the task-specific training data computation unit 115. In an embodiment, the task-specific training data is annotations indicating locations of the rendered object of interest. For example, the locations may be (x, y, width, height) coordinates of 2D bounding boxes enclosing each rendered object of interest. In an embodiment, for segmentation, the task-specific training data is the rendered objects of interest having each pixel within a rendered object of interest replaced with an object identifier associated with the rendered object of interest. The object identifier may be shared with other objects in the same class or may be unique for each rendered object of interest.

At step 145, the task-specific training data corresponding to the object of interest and the input image are included as a test pair in a training dataset for training a neural network. In an embodiment, the training dataset is stored in a memory. In an embodiment, the training dataset that is generated by the labeled training data generation system 100 is simultaneously used to train a neural network model. In other words, the training of the neural network model is performed concurrently with generation of the labeled training data.

To better enable a neural network model to learn to ignore objects in an input image that are not of interest, a random number of rendered 3D geometric shapes may be inserted into the input image. The rendered geometric shapes may be referred to as flying distractors. In an embodiment, the geometric shapes are rendered according to the rendering parameters. In an embodiment, the generated training data includes synthetic input images including the rendered 3D objects of interest and rendered 3D flying distractors. In an embodiment a number, types, colors, and scales of the geometric shapes, selected from a set of 3D models (cones, pyramids, spheres, cylinders, partial toroids, arrows, pedestrians, trees, etc.).

Figure 2A:
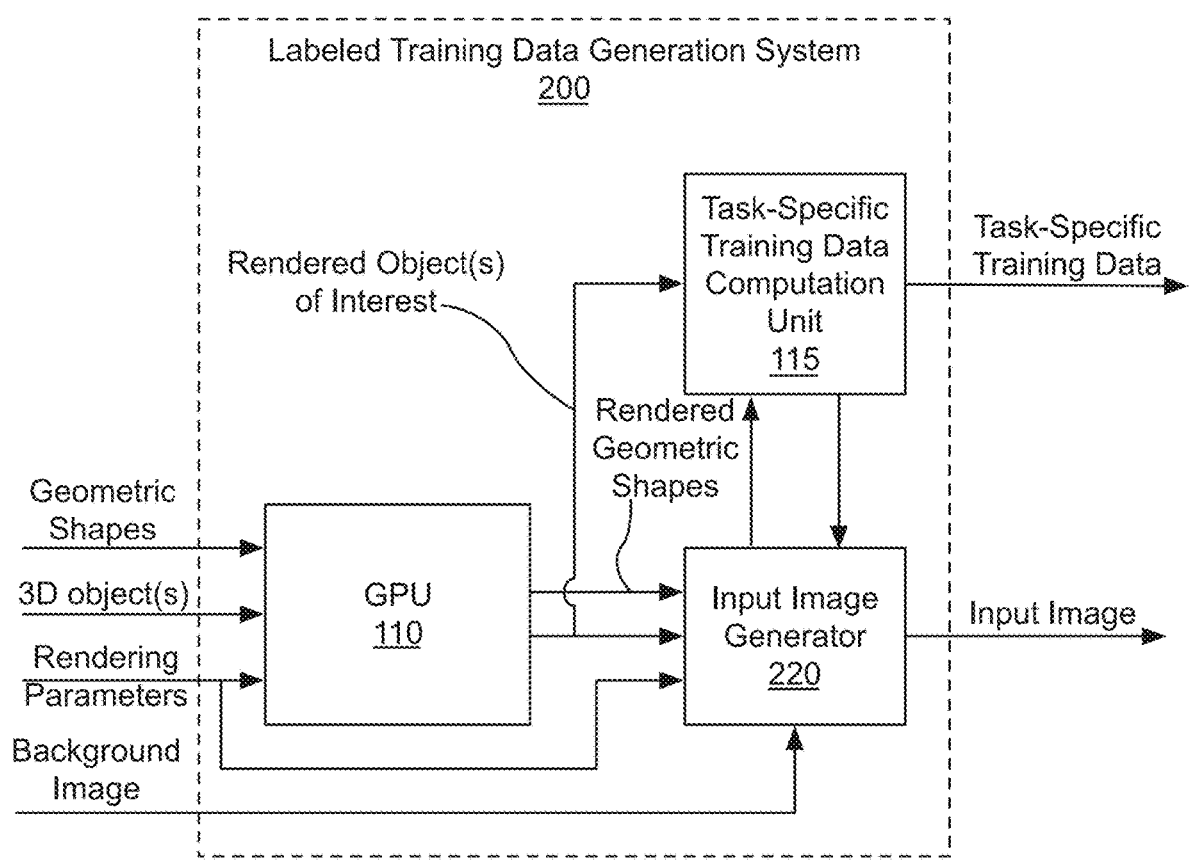
FIG. 2A illustrates a block diagram of another labeled training data generation system, in accordance with an embodiment.

FIG. 2A illustrates a block diagram of another labeled training data generation system 200, in accordance with an embodiment. The labeled training data generation system 200 includes a graphics processing unit (GPU) 110, the task-specific training data computation unit 115, and an input image generator 220. Although the labeled training data generation system 200 is described in the context of processing units, one or more of the GPU 110, the task-specific training data computation unit 115, and the input image generator 220 may be performed by a program, custom circuitry, or by a combination of custom circuitry and a program. For example, the task-specific training data computation unit 115 may be implemented by the GPU 110 or an additional GPU 110, CPU (central processing unit), or any processor capable of computing task-specific training data. In an embodiment, parallel processing unit (PPU) 300 of FIG. 3 is configured to implement the labeled training data generation system 200. Furthermore, persons of ordinary skill in the art will understand that any system that performs the operations of the labeled training data generation system 200 is within the scope and spirit of embodiments of the present disclosure.

The GPU 110 renders the 3D objects of interest as previously described to produce rendered images of objects of interest. The GPU 110 also renders the geometric shapes according to the rendering parameters to produce rendered images of the geometric shapes. Importantly, a rendered image of the geometric shape is an image of a synthetic geometric shape and is not a photorealistic image or an object extracted from a photorealistic image. The rendering parameters may specify a position and/or orientation of the geometric shape in a 3D scene, a position and/or orientation of a virtual camera, one or more texture maps, one or more lights including color, type, intensity, position and/or orientation, and the like. In an embodiment, the geometric shape may be rendered according to different rendering parameters to produce additional rendered images of the object of interest. In an embodiment, one or more different geometric shape may be rendered according to the same or different rendering parameters to produce additional rendered images of the geometric shape.

The task-specific training data computation unit 115 does not receive the rendered image(s) of the geometric shapes because task-specific training data is computed based only on the rendered object(s) of interest. In an embodiment, the task is object detection and the neural network model that is trained should ignore the rendered image(s) of the geometric shape(s) and detect the rendered image(s) of the object(s) of interest. In an embodiment, the task is segmentation and the neural network model that is trained should ignore the rendered image(s) of the geometric shape(s) and segment only the rendered image(s) of the object(s) of interest.

The input image generator 220 receives the rendered image(s) of the geometric shape(s), the rendered image(s) of the object(s) of interest, and a background image. The input image generator 220 constructs an input image that combines the background image, the rendered image(s) of the object(s) of interest, and the rendered image(s) of the geometric shape(s). The input image is paired with the task-specific training data to produce a test pair for generated labeled training data for training a neural network model. The rendered objects of interest are 3D synthetic objects that a neural network model may be trained to detect and/or segment. The rendered geometric shapes are 3D synthetic geometric shapes that a neural network model may be trained to ignore.

Figure 2B:
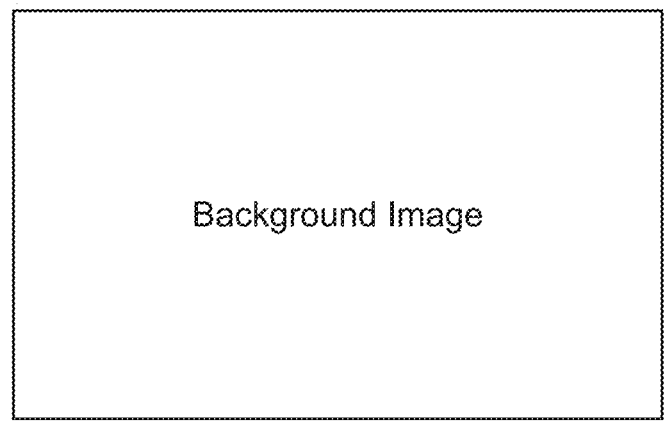
FIG. 2B illustrates the background image, rendered 3D geometric shapes, and another input image with the task-specific training data, in accordance with an embodiment.
Figure 2B:
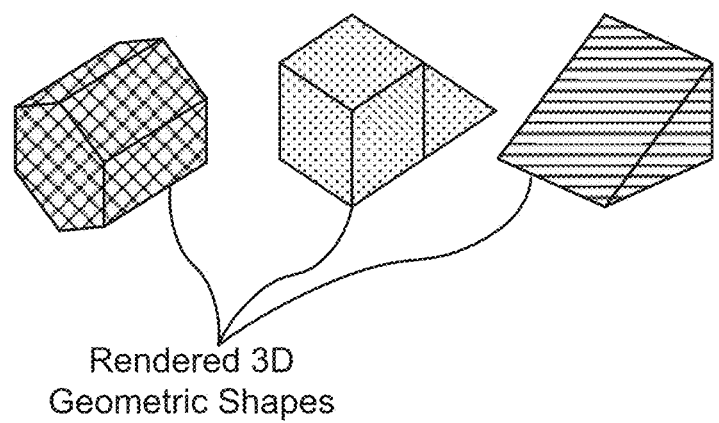
Figure 2B:
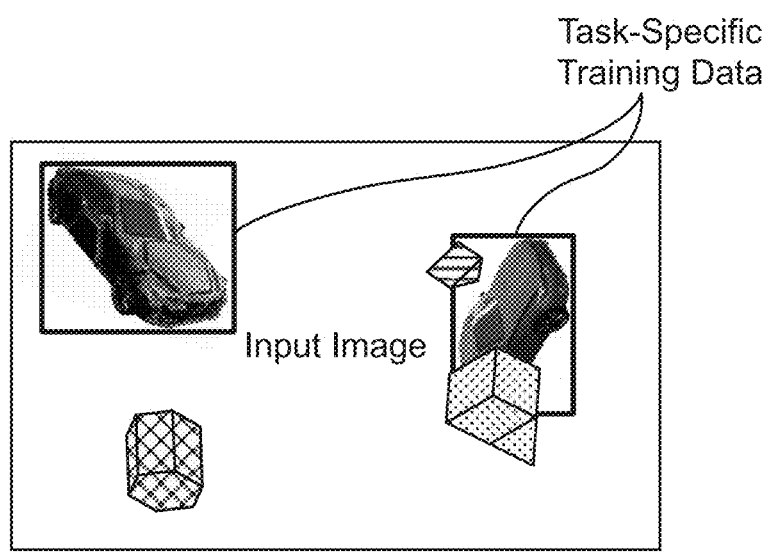

FIG. 2B illustrates the background image, rendered 3D geometric shapes, and an input image with the task-specific training data, in accordance with an embodiment. In an embodiment, the background image is a 2D image. As shown in FIG. 2B, 3D geometric shapes are rendered to produce three different rendered images of the object of interest. Note that at least a portion of the rendering parameters vary for each one of the rendered images. For example, different texture maps are applied to each one of the 3D geometric shapes. A color of and/or the orientation of each 3D geometric shape may vary. In an embodiment, each 3D geometric shape is selected from a set of 3D synthetic geometric shapes. In an embodiment, one or more of the 3D geometric shape are selected by the labeled training data generation system 100. The rendering parameters specify aspects of a 3D scene including the 3D geometric shape(s) to be rendered and, therefore, may affect the appearance of the rendered 3D geometric shape(s).

The input image generator 220 constructs the input image by combining the rendered object(s) of interest, the rendered geometric shapes, and the background image, positioning the rendered object(s) of interest and the rendered geometric shapes at various positions within the input image. Each the rendered geometric shape may be scaled in size and/or rotated. In an embodiment, the number of the rendered geometric shapes and the position, scale, and/or rotation for each rendered object of interest is defined by the rendering parameters. In an embodiment, the number of the rendered geometric shapes and the position, scale, and/or rotation for each rendered geometric shape is randomly determined by the input image generator 220. As shown in FIG. 2B, the task-specific training data computed by the task-specific training data computation unit 115 for each rendered object of interest is a bounding box. Note, no task-specific training data is computed for the rendered geometric shapes.

A particular rendered object of interest may be occluded by one or more other rendered objects of interest and/or rendered geometric shapes. When the portion of a rendered object of interest that is occluded is greater than a predetermined threshold value, the task-specific training data corresponding to the rendered object of interest may be modified. In one embodiment, when 98% of a rendered object of interest is occluded, the task-specific training data corresponding to the rendered object of interest is omitted from the task-specific training data.

The labeled training data generation system 200 generates test pairs for training deep neural networks for object detection using synthetic 3D objects. To synthesize the variability in real-world data, the labeled training data generation system 200 relies upon the technique of domain randomization, in which the rendering parameters—such as lighting, pose, object textures, etc.—are randomized or specified to produce non-realistic input images to force a neural network model to learn the essential features of the object of interest.

Figure 2C:
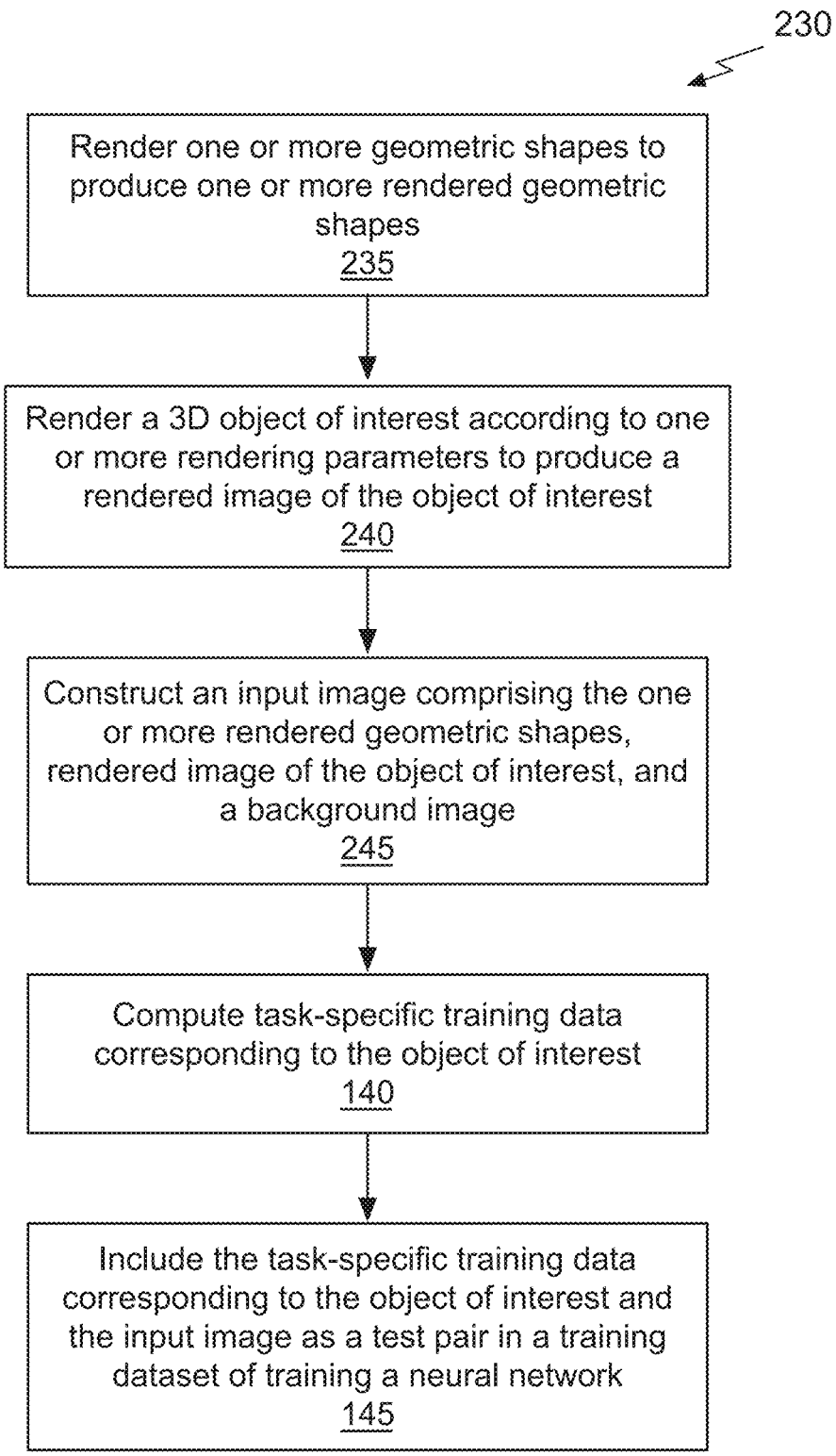
FIG. 2C illustrates a flowchart of another method for generating labeled training data, in accordance with an embodiment.

FIG. 2C illustrates a flowchart of another method 230 for generating labeled training data, in accordance with an embodiment. Although method 230 is described in the context of a processing unit, the method 230 may also be performed by a program, custom circuitry, or by a combination of custom circuitry and a program. For example, the method 230 may be executed by a GPU (graphics processing unit), CPU (central processing unit), or any processor capable of rendering 3D objects, constructing images, and computing labels. Furthermore, persons of ordinary skill in the art will understand that any system that performs method 230 is within the scope and spirit of embodiments of the present disclosure.

At step 135, the GPU 110 renders one or more 3D geometric shapes to produce one or more rendered geometric shapes. The 3D geometric shapes are rendered according to the rendering parameters. In an embodiment, the GPU 110 renders at least one of the 3D geometric shapes using different rendering parameters to produce additional rendered images of the geometric shape. In an embodiment, the GPU 110 renders different 3D geometric shapes using the same rendering parameters or using different rendering parameters to produce different rendered images of geometric shapes.

At step 240, the GPU 110 renders a 3D object of interest according to one or more rendering parameters to produce a rendered image of the object of interest. At step 245, the input image generator 220 constructs an input image comprising the rendered image of the object of interest, the one or more rendered geometric shapes, and a background image.

Steps 140 and 145 are completed as previously described in conjunction with FIG. 1B. In an embodiment, the training dataset that is generated by the labeled training data generation system 200 is simultaneously used to train a neural network model. In other words, the training of the neural network model is performed concurrently with generation of the training dataset.

Incorporation of the rendered geometric shapes into the input image improves object detection and/or estimation accuracy for neural network models trained using the training dataset generated by the labeled training data generation system 200. The various rendering parameters may have varying influences on the performance of a neural network model trained using the training dataset. In an embodiment, a neural network model is trained using only the training dataset that is generated using synthetic objects of interest. In an embodiment, a neural network model is trained using the task-specific training dataset that is generated using synthetic objects of interest and a lesser amount of real data that is labeled. In an embodiment, during training, one or more of the following data augmentations are applied to the training dataset: random brightness, random contrast, random Gaussian noise, random flips, random resizing, box jitter, and random crop.

Figure 2D:
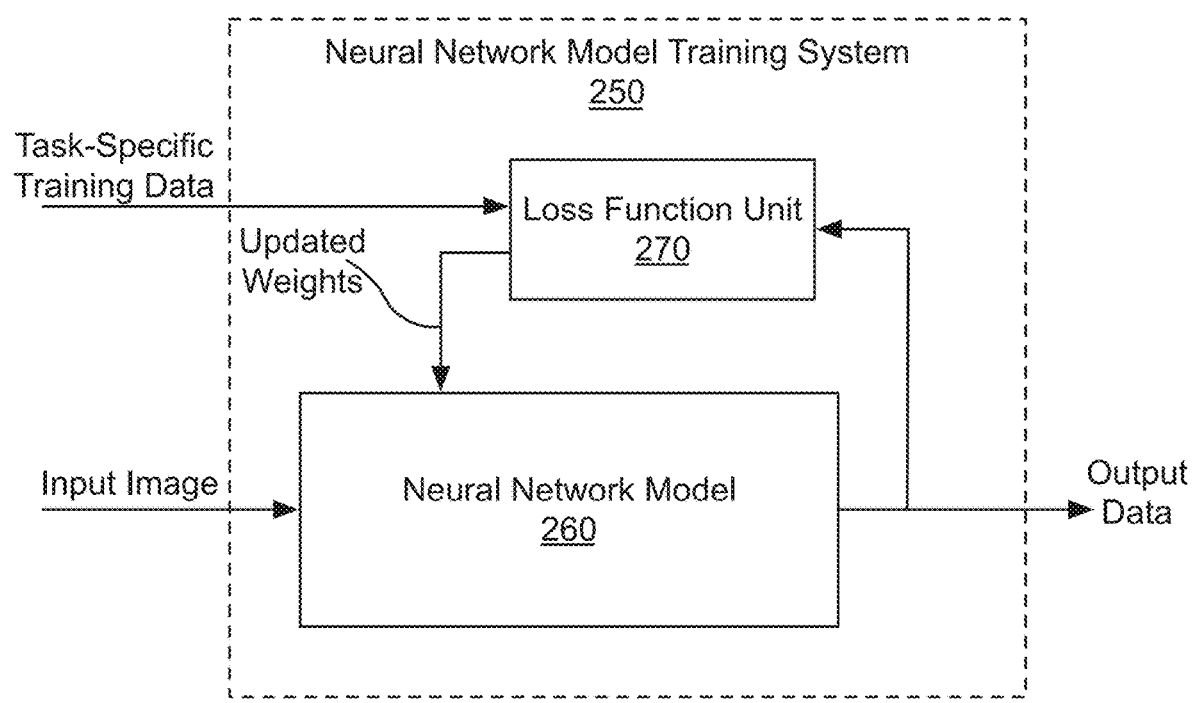
FIG. 2D illustrates a block diagram of neural network model training system, in accordance with an embodiment.

FIG. 2D illustrates a block diagram of neural network model training system 250, in accordance with an embodiment. The neural network model training system 250 includes a neural network model 260 and a loss function unit 270. Although the neural network model training system 250 is described in the context of processing units, one or more of the neural network model 260 and the loss function unit 270 may be performed by a program, custom circuitry, or by a combination of custom circuitry and a program. For example, the neural network model 260 may be implemented by a GPU 110, CPU (central processing unit), or any processor capable of implementing a neural network model. In an embodiment, parallel processing unit (PPU) 300 of FIG. 3 is configured to implement the neural network model training system 250. Furthermore, persons of ordinary skill in the art will understand that any system that performs the operations of the neural network model training system 250 is within the scope and spirit of embodiments of the present disclosure.

During training, the input images for test pairs included in the training dataset are processed, according to weights, by the neural network model 260 to generate output data. The output data and task-specific training data for the test pairs are processed by the loss function unit 270. The loss function unit 270 generates updated weights to reduce differences between the task-specific training data and the output data. When the differences are reduced to a predetermined value, training is complete. In an embodiment, the neural network model 260 is a convolutional neural network (CNN), recurrent CNN, feed-forward CNN, a region-based fully convolutional neural network, or the like.

Although the input images may appear crude (and almost cartoonish) and not aesthetically pleasing, this apparent limitation is arguably an asset: Not only are the input images orders of magnitude faster to create (with less expertise required) compared with manual labeling of photorealistic images, but the input images include variations that force a deep neural network to focus on the important structure of the problem at hand rather than details that may or may not be present in real images at test time. Furthermore, the domain randomization-based approach generation of training dataset with a large amount of variety is easily achieved, in contrast with existing conventional training dataset generation techniques. Inexpensive synthetic data may be used to generate labeled training datasets for training neural networks while avoiding the need to collect large amounts of hand-annotated real-world data or to generate high-fidelity synthetic worlds—both of which remain bottlenecks for many applications.

The training dataset generated by the labeled training data generation system 100 or 200 may be used to train a neural network model to accomplish complex tasks such as object detection with performance comparable to more labor-intensive (and therefore more expensive) datasets. By randomly perturbing the synthetic images during training, domain randomization intentionally abandons photorealism to force the neural network to learn to focus on the relevant features. With fine-tuning on real images, domain randomization may outperform more photorealistic datasets and may improve upon training results obtained using real data alone.

Parallel Processing Architecture

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
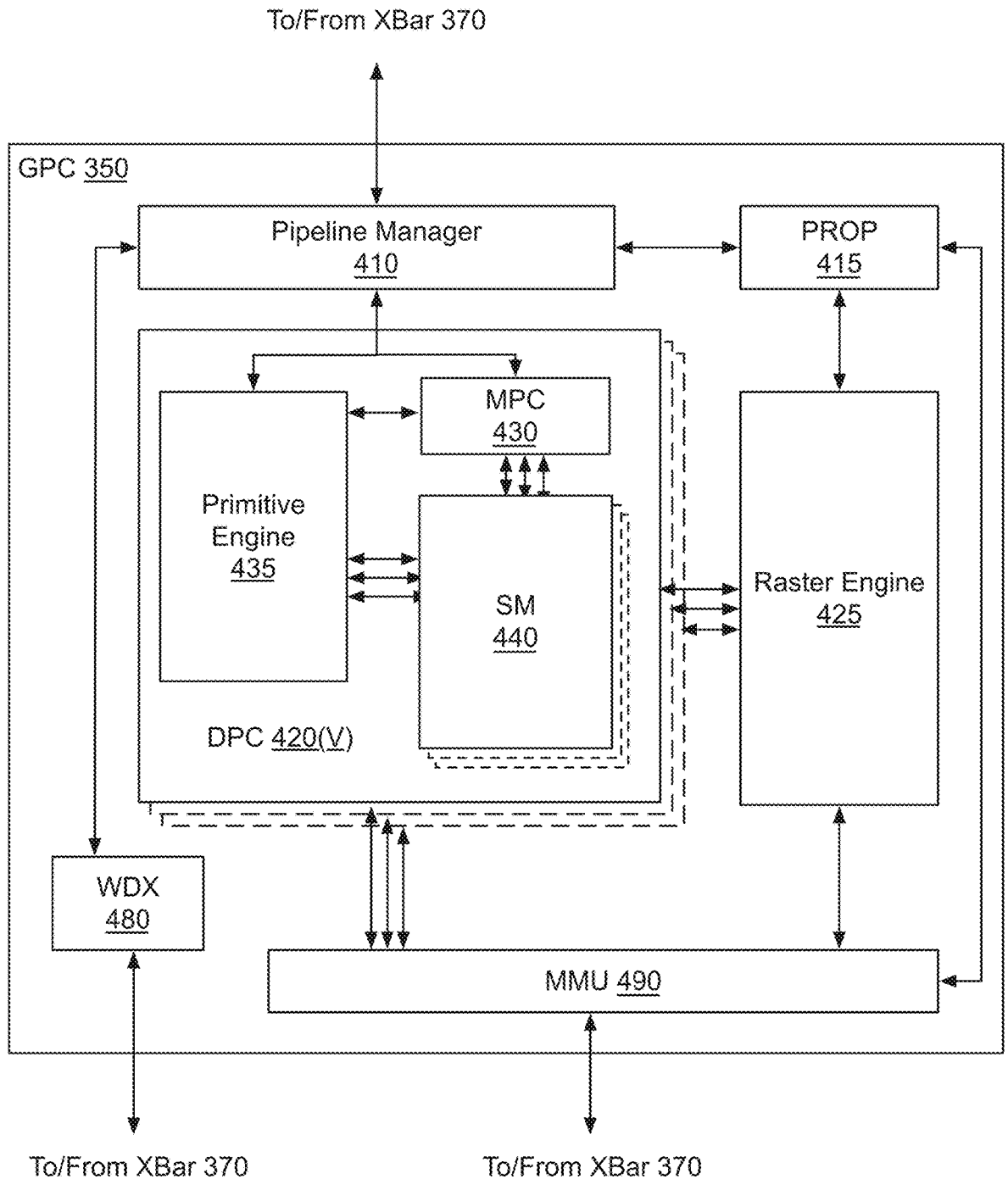
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
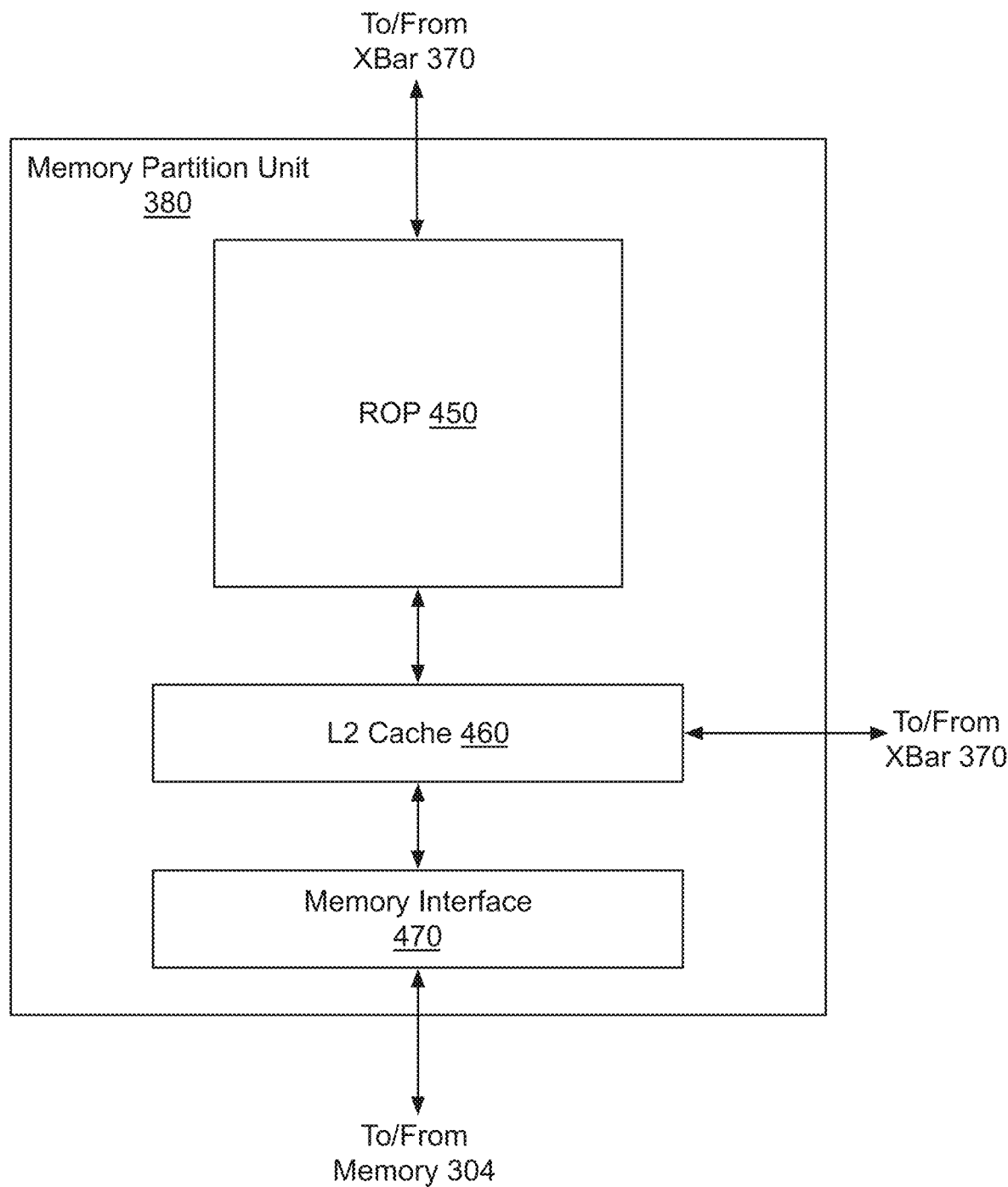
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
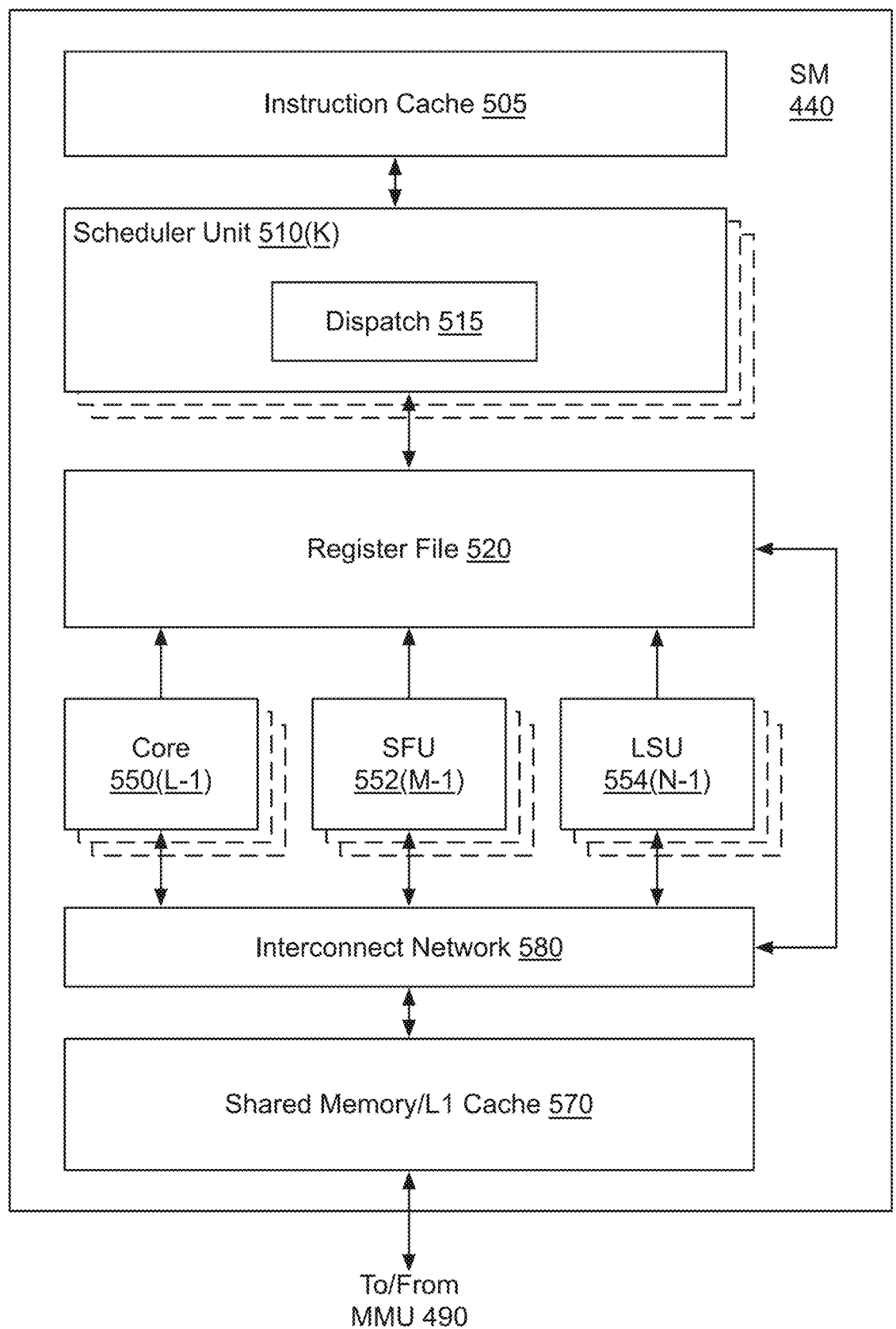
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
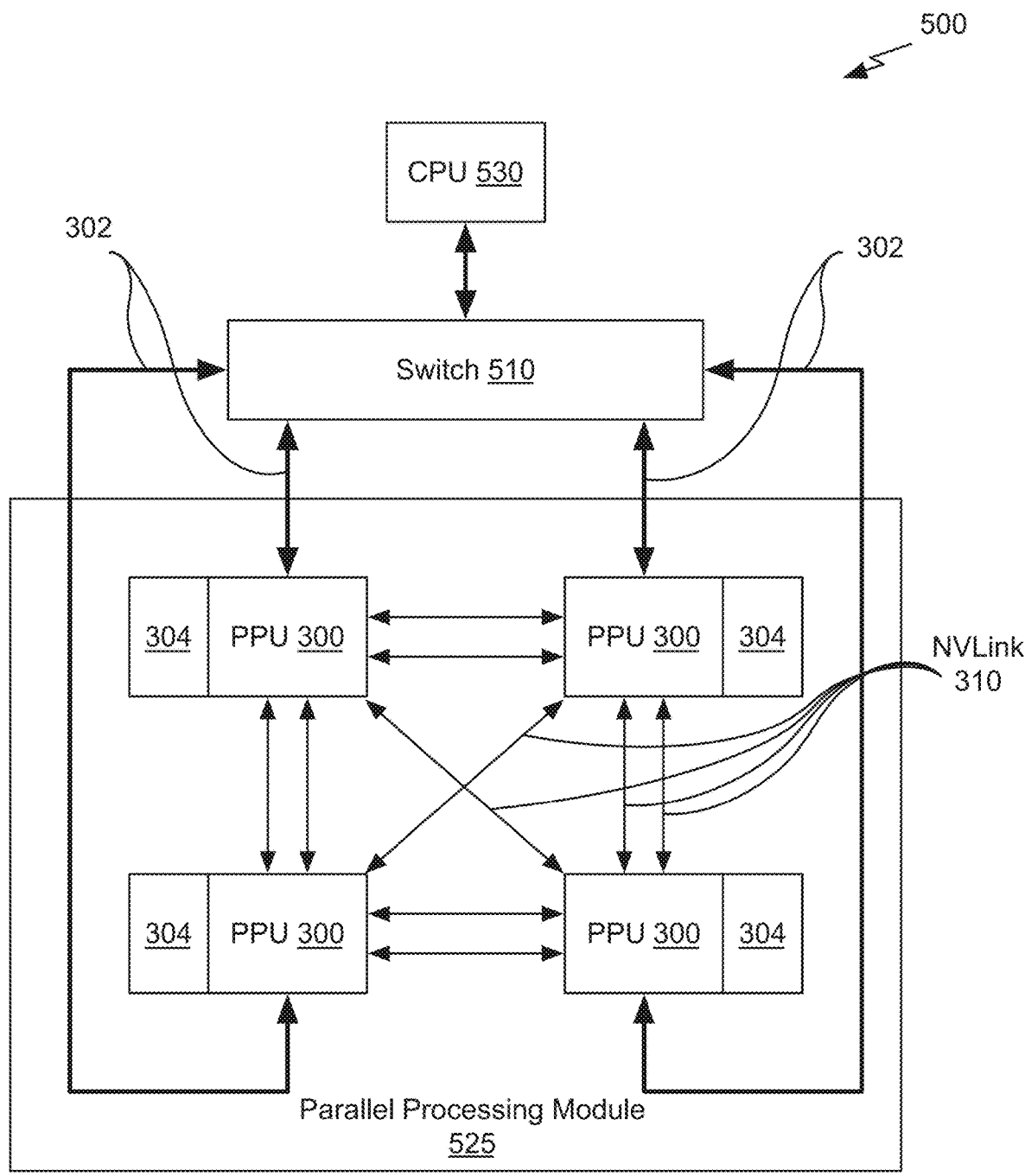
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the methods 130 and 230 shown in FIGS. 1B and 2B, respectively. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
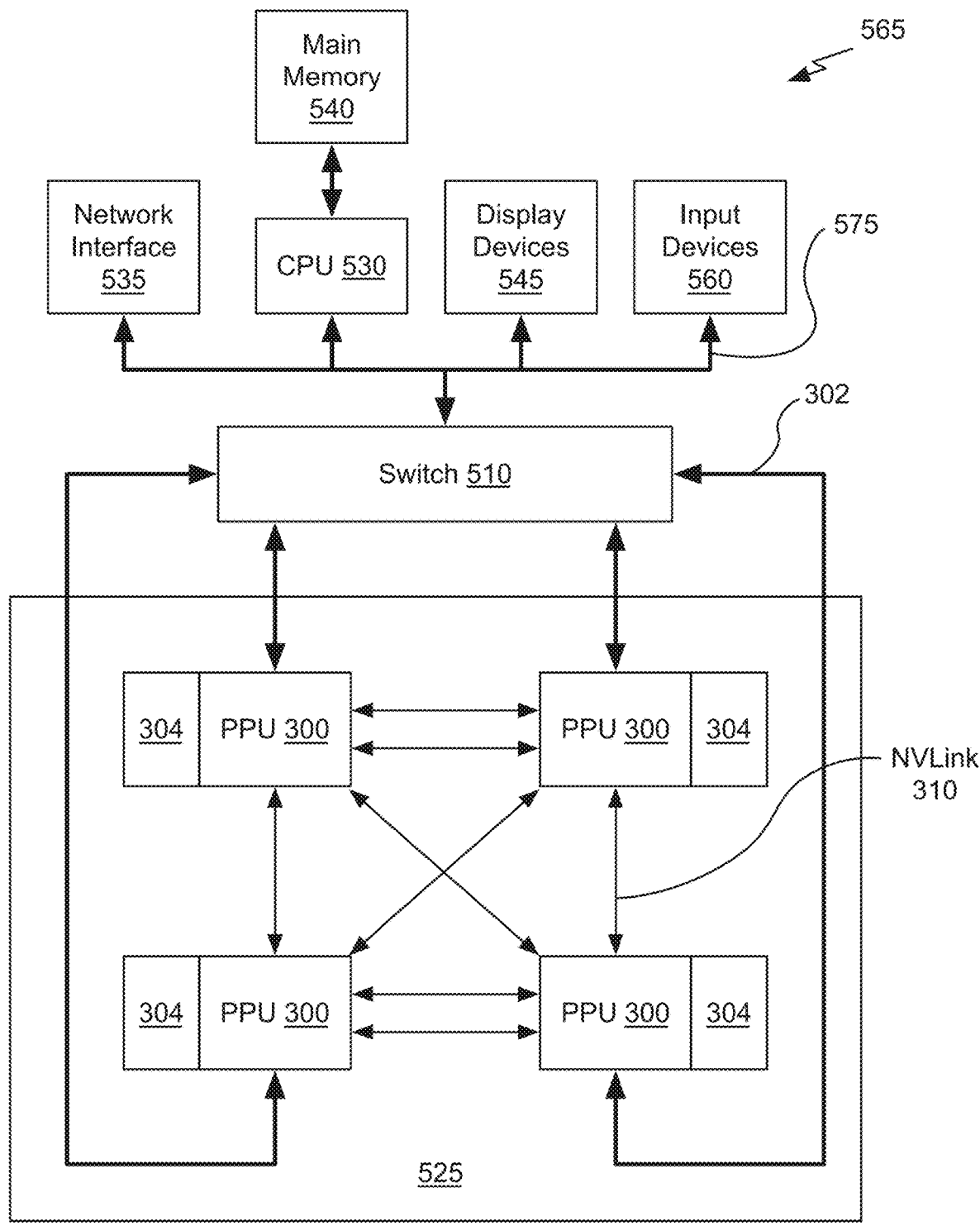
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the methods 130 and 230 shown in FIGS. 1B and 2B, respectively.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like.

Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
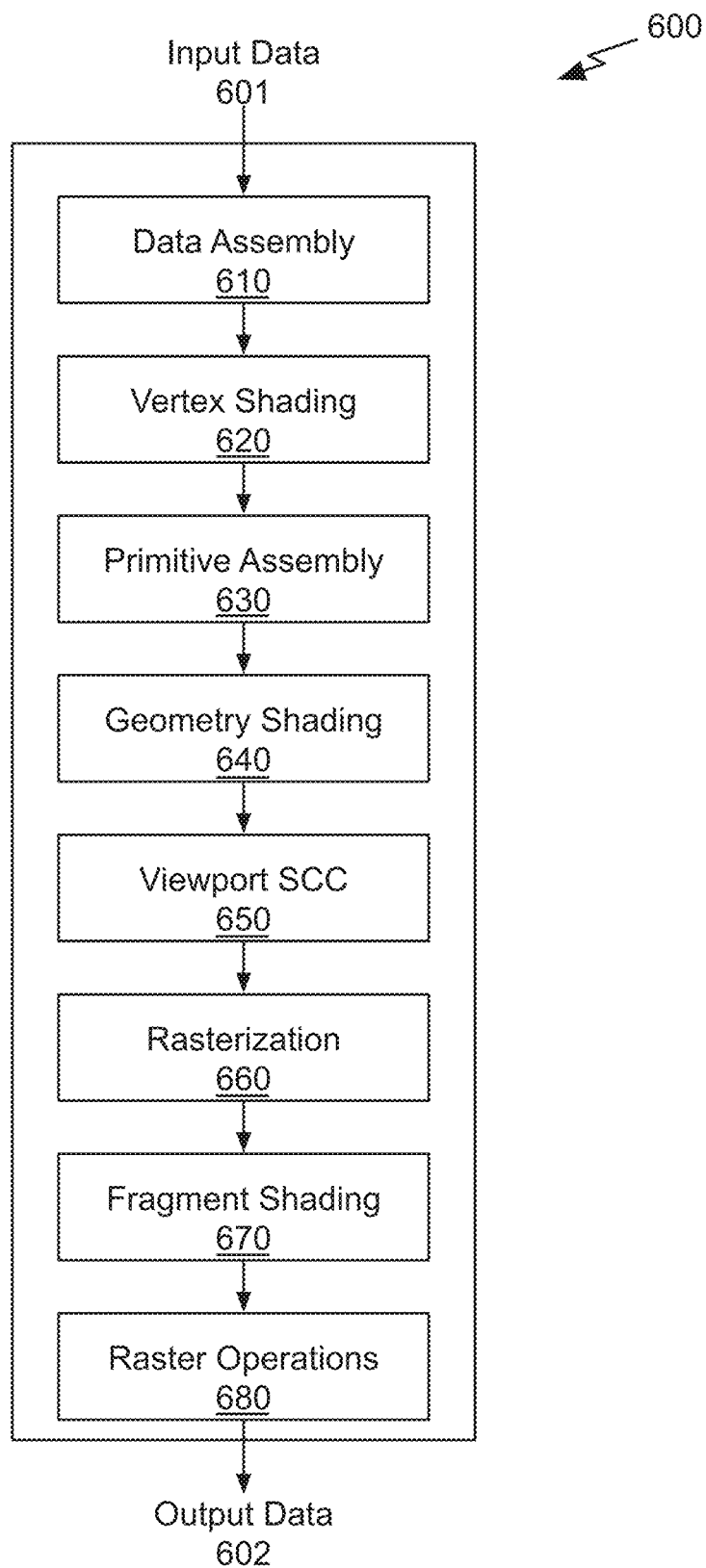
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy.

In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A processor, comprising:
one or more processing units to receive, using a neural network model, an input image comprising at least one object of interest and an additional object, wherein the neural network is trained to ignore the additional object and to produce task-specific output data corresponding to the object of interest by using a training dataset that includes synthetic input images rendered according to rendering parameters that define visibility of a ground plane in a three-dimensional (3D) scene, and at least one of:
one or more texture maps applied to the object of interest and the additional object, or
one or more colors of the object of interest and the additional object.

2. The processor of claim 1, wherein the synthetic input images are constructed from rendered 3D objects of interest, one or more rendered 3D geometric shapes, and task-specific training data corresponding to the 3D objects of interest.

3. The processor of claim 2, wherein the one or more rendered 3D geometric shapes are omitted from the task-specific training data.

4. The processor of claim 2, wherein the 3D objects of interest are rendered according to rendering parameters that comprise at least one of:
data corresponding to a position of a light;
data corresponding to an orientation of a light;
data corresponding to a color of the light; or
data corresponding to an intensity of the light.

5. The processor of claim 2, wherein the 3D objects of interest are rendered by applying a texture map to at least one of the 3D objects of interest.

6. The processor of claim 2, wherein the one or more 3D geometric shapes are rendered by applying a texture map to at least one of the one or more 3D geometric shapes.

7. The processor of claim 2, wherein the task-specific training data is computed and the one or more rendered 3D geometric shapes are omitted from the task-specific training data.

8. The processor of claim 1, wherein the synthetic input images include a background image of a 3D scene.

9. The processor of claim 1, wherein the task-specific output data is associated with at least one of an instance segmentation task, an object detection task, or a semantic segmentation task.

10. The processor of claim 1, wherein the task-specific output data defines a location and dimensions of a bounding shape enclosing the object of interest.

11. The processor of claim 1, wherein the task-specific output data comprises an object identifier for each pixel that is covered by the object of interest.

12. The processor of claim 1, wherein the one or more processing units are included in a server or in a data center and the task-specific output data is streamed to a device.

13. The processor of claim 1, wherein the one or more processing units are included in a server or in a data center and the input image is received from a device.

14. The processor of claim 1, wherein the neural network model is deployed in a machine, robot, or autonomous vehicle.

15. The processor of claim 2, wherein the 3D objects of interest are rendered according to rendering parameters that define a scale of each rendered 3D object of interest.

16. The processor of claim 1, wherein training of the neural network occurs at least partially simultaneously with generation of the synthetic input images in the training dataset.

17. A non-transitory, computer-readable storage medium storing instructions that, when executed by a processing unit, cause the processing unit to receive, using a neural network model, an input image comprising at least one object of interest and an additional object, wherein the neural network model is trained to ignore the additional object and to produce task-specific output data corresponding to the object of interest by using a training dataset that includes synthetic input images rendered according to rendering parameters that define visibility of a ground plane in a three-dimensional (3D) scene, and at least one of:
one or more texture maps applied to the object of interest and the additional object, or
one or more colors of the object of interest and the additional object.

18. The non-transitory, computer-readable storage medium of claim 17, wherein
the synthetic input images are constructed from rendered 3D objects of interest, one or more rendered 3D geometric shapes, and task-specific training data corresponding to the 3D objects of interest.

19. The non-transitory, computer-readable storage medium of claim 17, wherein the task-specific output data is associated with at least one of an instance segmentation task, an object detection task, or a semantic segmentation task.

20. A computer-implemented method, comprising:
receiving, by a neural network model, an input image comprising at least one object of interest and an additional object; and
processing the input image, by the neural network model, wherein the neural network model is trained to ignore the additional object and produce task-specific output data corresponding to the object of interest by using a training dataset that includes synthetic input images rendered according to rendering parameters that define each of visibility of a ground plane in a three-dimensional (3D) scene, texture maps applied to the object of interest and the additional object, and colors of the object of interest and the additional object.

21. The computer-implemented method of claim 20, wherein the synthetic input images are constructed from rendered 3D objects of interest, one or more rendered 3D geometric shapes, and task-specific training data corresponding to the 3D objects of interest.

22. The computer-implemented method of claim 21, wherein the one or more rendered 3D geometric shapes are omitted from the task-specific training data.

* * * * *